(12) United States Patent
Cole et al.

(10) Patent No.: US 11,328,300 B2
(45) Date of Patent: May 10, 2022

(54) ENHANCED SECURITY FOR TRANSACTION REQUESTS UTILIZING AUTOMATIC SOURCE IDENTIFICATION

(71) Applicant: First Data Corporation, Coral Springs, FL (US)

(72) Inventors: Robert J. Cole, Maysville, GA (US); Mary Januszka, Woodstock, GA (US); Alan Todd Blackburn, Dawsonville, GA (US); John J. Petrizzo, Marietta, GA (US); Robert J. Seitz, Lilburn, GA (US); Tim Seligman, Coral Springs, FL (US); Eric Stormo, Coral Springs, FL (US)

(73) Assignee: FIRST DATA CORPORATION, Brookfield, WI (US)

( * ) Notice: Subject to any disclaimer, the term of this patent is extended or adjusted under 35 U.S.C. 154(b) by 17 days.

(21) Appl. No.: 16/191,819

(22) Filed: Nov. 15, 2018

(65) Prior Publication Data

US 2019/0147449 A1 May 16, 2019

Related U.S. Application Data

(60) Provisional application No. 62/587,287, filed on Nov. 16, 2017.

(51) Int. Cl.
| | |
|---|---|
| *G06F 16/903* | (2019.01) |
| *G06Q 20/16* | (2012.01) |
| *G06Q 20/20* | (2012.01) |
| *G06Q 20/40* | (2012.01) |
| *G06F 16/24* | (2019.01) |

(52) U.S. Cl.
CPC ........ *G06Q 20/4016* (2013.01); *G06F 16/24* (2019.01); *G06F 16/90335* (2019.01); *G06Q 20/16* (2013.01); *G06Q 20/202* (2013.01)

(58) Field of Classification Search
CPC .................................................. G06Q 20/4016
See application file for complete search history.

(56) References Cited

U.S. PATENT DOCUMENTS

| | | | |
|---|---|---|---|
| 5,793,861 | A * | 8/1998 | Haigh |
| 6,031,840 | A * | 2/2000 | Christie |
| 2005/0047334 | A1* | 3/2005 | Paul |

(Continued)

OTHER PUBLICATIONS

Patil, et al., in "Unmasking of Source Identity, a Step Beyond Cyber Forensic," in ACM, 2017 (Year: 2017).*

*Primary Examiner* — Mike Anderson
*Assistant Examiner* — Brandon M Duck
(74) *Attorney, Agent, or Firm* — Foley & Lardner LLP

(57) ABSTRACT

Described herein are methods and systems for enhancing security of transaction requests from POS terminals by utilizing ANI-DNIS information. The header of the transaction request can include automatic source information ("ASI"), which can be extracted from the header by the line handler. The ASI information can be provided to the front end interface, which can compare the ASI information with known customer information. The comparison can provide information indicating whether the transaction is legitimate or fraudulent. If fraudulent, the transaction request can be declined. The ASI information can further be stored in a security analysis database and further queried to identify larger threats including denial of service attacks.

21 Claims, 6 Drawing Sheets

(56) References Cited

U.S. PATENT DOCUMENTS

2006/0018441 A1* 1/2006 Timmins
2008/0240376 A1* 10/2008 Conway
2012/0123941 A1* 5/2012 Kimes
2012/0233273 A1* 9/2012 Miner
2013/0275528 A1* 10/2013 Miner
2016/0227042 A1* 8/2016 Gray

* cited by examiner

ENHANCED SECURITY FOR TRANSACTION REQUESTS UTILIZING AUTOMATIC SOURCE IDENTIFICATION

CROSS-REFERENCES TO RELATED APPLICATIONS

This Application claims the benefit of and priority to U.S. Provisional Application No. 62/587,287, entitled "ENHANCED SECURITY FOR TRANSACTION REQUESTS UTILIZING AUTOMATIC SOURCE IDENTIFICATION," filed Nov. 16, 2017, which is incorporated herein by reference in its entirety for all purposes.

BACKGROUND

Fraudulent financial activities of unscrupulous individuals are a significant source of crimes committed every year. For example, transactions from point of sale ("POS") devices or other payment terminals can be fraudulent. Detection of fraudulent transactions can be challenging because thieves and other unscrupulous individuals are constantly developing new and improved ways of trying to successfully complete fraudulent transactions.

BRIEF SUMMARY

A system of one or more computers can be configured to perform particular operations or actions by virtue of having software, firmware, hardware, or a combination of them installed on the system that in operation cause the system to perform the actions. One or more computer programs can be configured to perform particular operations or actions by virtue of including instructions that, when executed by data processing apparatus, cause the apparatus to perform the actions. One general aspect includes a method that may include receiving a transaction request having a header by a line handler. The line handler may determine that the header is a source information header ("SIH") that includes automatic source identification ("ASP") information. The line handler may extract the ASI information from the SIH and generate a fast internal message ("FIM") including the ASI. A front end interface may receive the FIM and identify a source sender from the FIM. The front end interface may obtain information about the source sender from a database containing client information and compare the FIM with the obtained information about the source sender. When the FIM does not match the obtained information about the source sender, the front end interface may decline the transaction request. The front end interface may store data from the FIM, including the ASI, in the database. Other embodiments of this aspect include corresponding computer systems, apparatus, and computer programs recorded on one or more computer storage devices, each configured to perform the actions of the methods.

Implementations may include one or more of the following features. The comparing may include identifying an expected source value from the obtained information about the source sender. The comparing may also include identifying, from the ASI in the FIM, a source value of the transaction request. The method may also include determining whether the FIM matches the obtained information about the source sender based on whether the expected source value matches the source value of the transaction request.

Optionally, the comparing can include identifying an expected transmission line for receiving the transaction request from the obtained information about the source sender. The comparing may also include identifying, from the FIM, a transmission line on which the transaction request was received. The comparing may also include determining whether the FIM matches the obtained information about the source sender based on whether the expected transmission line matches the transmission line on which the transaction request was received.

Optionally, the comparing can include identifying an expected message format for the transaction request from the obtained information about the source sender. The comparing may also include identifying, from the FIM, a message format for the transaction request. The comparing may also include determining whether the FIM matches the obtained information about the source sender based on whether the expected message format matches the message format for the transaction request.

Optionally, the ASI may include an internet protocol ("IP") address from which the transaction request originated. Optionally, the ASI may include a telephone number from which the transaction request originated. Optionally, the method can include storing the ASI information in a security analysis database and identifying fraudulent activity based on queries of the security analysis database. Implementations of the described techniques may include hardware, a method or process, or computer software on a computer-accessible medium.

DETAILED DESCRIPTION

Thousands of transactions from point of sale ("POS") devices or other payment terminals are completed daily. Many of the transactions are legitimate, but a portion of them are fraudulent. The fraudulent transactions can cost companies millions of dollars each year. Identifying the fraudulent transaction requests to prevent them from successfully completing is an ongoing effort. Those that engage in fraudulent activities are constantly developing new techniques for cheating the systems. As such, the techniques to counteract these fraudulent activities must constantly evolve.

Described herein are techniques for counteracting fraudulent transaction requests from POS devices utilizing automatic number identification ("ANI") and dialed number identification service ("DNIS") ("ANI-DNIS"). The ANI identifies the origination telephone number for an inbound call or connection. The DNIS is a code that identifies the number dialed by the originator of an inbound call or connection. Each of these values is used for identifying the source of a dialed connection. In the case of requests originating from the POS device over an internet protocol ("IP") connection, the source IP address can be used to identify the source sender. Because connections can be of either type, the term automatic source identification ("ASP") will be used herein to encompass source information from a dialed connection or from an IP connection.

In some embodiments, a transaction level identifier may be used. A transaction level identifier may be a unique identifier used to mitigate fraudulent interception of transaction information. The unique transaction level identifier can enable multiple levels of security for any given transaction as described in detail herein.

Figure 1:
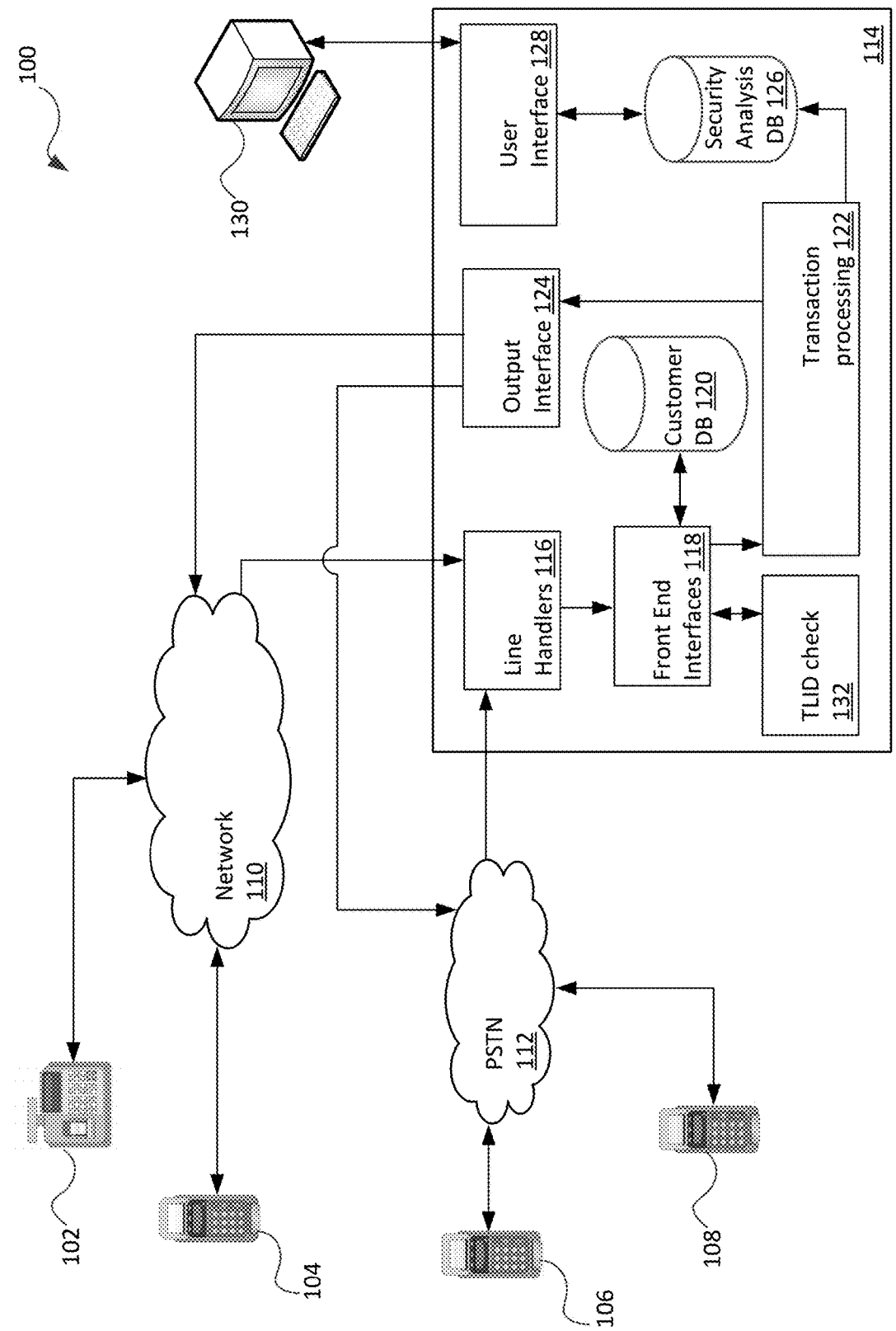
FIG. 1 illustrates a simplified block diagram of a system for enhanced security using Automatic Source Identification "ASI."

FIG. 1 illustrates a system 100 for enhancing security using ASI. The system 100 can include POS devices 102, 104, 106, and 108, network 110, public switched telephone network ("PSTN") 112, transaction system 114, and terminal 130.

System 100 can include point of service ("POS") devices 102, 104, 106, and 108. The POS devices 102, 104, 106, and 108 can be credit transaction processing devices. Though only four devices are shown, any number of POS devices 102, 104, 106, and 108 can be in system 100. The POS devices 102, 104, 106, and 108 can be located worldwide. Each POS device 102, 104, 106, and 108 can be implemented similarly to, for example, computer system 400 of FIG. 4. As shown in FIG. 1, some POS devices, such as POS device 102 and POS device 104, can communicate via network 110 with transaction system 114 while other POS devices, such as POS device 106 and POS device 108, can communicate via PSTN 112 with transaction system 114.

Network 110 can be any network capable of handling internet protocol ("IP") communication. Network 110 can be, for example, the Internet, a wide area network, a local area network, or any other suitable network. Network 110 can allow, for example, POS devices 102 and 104 to communicate with transaction system 114. Communications occurring over network 110 may utilize the internet protocol, and connected components may have an IP address. The IP address can be a 64 bit value for the IP4 protocol version or a 128 bit value for the IP6 protocol version. Accordingly, POS device 102, POS device 104, and transaction system 114 each have a unique IP address used for communication over network 110. While descriptions herein use the IP, any network communication protocols may be used over network 110. Today the most standard protocol is IP over the internet. However, using any network protocol each device may have a unique address (e.g., an IP address). In any such network, the address of the source or originator may be used in place of an IP address to complete the same goals as described herein. This disclosure is not limited to use of IP.

PSTN 112 can allow communication through dialed connections. It can be the network used for public telecommunication. Communications occurring over PSTN 112 adhere to a single numbering plan for telephone number assignment to devices to allow devices around the world to dial each other. Accordingly, POS device 106, POS device 108, and transaction system 114 each have a unique telephone number used for communication over PSTN 112.

Transaction system 114 can include line handlers 116, front end interfaces 118, customer database 120, transaction processing subsystem 122, output interface 124, security analysis database 126, user interface 128, and transaction level identifier ("TLID") check subsystem 132. The transaction system 114 can process transactions originating from POS devices 102, 104, 106, and 108. Transaction system 114 can be, for example, computer system 400 of FIG. 4.

Line handlers 116 can be implemented as a software, hardware, and/or firmware component of transaction system 114. Line handlers 116 can be one or more line handlers that handle the incoming transaction requests on the communication lines. For example a first line to be handled may include traffic from PSTN 112, and therefore transaction requests from POS devices that communicate over PSTN 112, such as, for example, POS devices 106 and 108, may be handled by line handlers 116. A second line to be handled may include traffic from network 110, and therefore transaction requests from POS devices that communicate over network 110, such as, for example, POS devices 102 and 104, may be handled by other line handlers 116. The line handler 116 can be responsible, for example, for receiving an incoming transaction request on the designated line, identifying the header of the transaction request, and determining whether the header of the transaction request is a source information header ("SIH"). If the header is an SIH, the line handler 116 may extract the ASI from the SIH and build a fast internal message ("FIM") containing information from the transaction request, including the ASI, for processing the transaction request by the transaction system 114. An SIH can be a transaction request header that includes information about the source or origination of the transaction request. Such information about the source or origination of the transaction request may include ASI. The ASI may include a unique source address such as, for example, a telephone number (from a DNIS) or an IP address. A FIM may be a message formatted for use internally within transaction system 114. The FIM may be formatted in any way suitable to accomplish the data transmission within the internal system. For example, a FIM may use an internal message structure created for internal use by, for example, the front end interfaces 118, TLID check subsystem 132, and transaction processing subsystem 122. The FIM structure may standardize the message data into a format from multiple input and output formats. The standardized message format may facilitate simpler processing of a transaction without requiring specialized logic unique to each external message format.

Front end interfaces 118 can be implemented as a software, hardware, and/or firmware component of transaction system 114. Front end interfaces 118 can be one or more front end interfaces that interface with the line handlers 116. For each line handler 116, there is a corresponding front end interface 118. The front end interface can be responsible, for example, for receiving the FIM from the line handler and/or utilizing the ASI in the FIM to compare with known customer data to determine whether the transaction request is fraudulent.

TLID check subsystem 132 may be implemented as a software, hardware, and/or firmware component of transaction system 114. TLID check subsystem 132 may receive the FIM from front end interface 118 to check the transaction level identifier as an optional additional level of security to further ensure the transaction request is not fraudulent. In some embodiments, a unique transaction level identifier may be included in the transaction request from the POS device 102, 104, 106, 108. The POS device and the transaction system 114 may share a secret that allows the POS device 102, 104, 106, 108 to generate a transaction identifier that can be replicated only by the transaction system 114. The TLID check subsystem 132 may generate a transaction identifier and compare it with the transaction level identifier in the FIM to confirm a match. If the identifiers match, the TLID check subsystem 132 may respond to the front end interface 118 with approval to proceed, but if the identifiers do not match, the TLID check subsystem 132 may respond to the front end interface 118 declining the transaction request. As one example of a shared secret, a seed table may be used that includes multiple entries. The seed table may be unique to each POS device 102, 104, 106, 108, and transaction system 114 may have a copy of each seed table for each POS device 102, 104, 106, 108. A code may be used that allows the POS device 102, 104, 106, and 108 to use the correct entry in the seed table. For example, a portion of the transaction request time stamp may be used to select the seed table entry. Since only the unique POS device (102, 104, 106, or 108) and the transaction system 114 have copies of the seed table, the value selected from the seed table for each specific transaction request will be known only by the POS device and the transaction system 114. As a further step, the value from the seed table may be used as an encryption key. For example, the value from the seed table may be combined in a specific manner with other values from the transaction request (e.g., the seed table value may be concatenated on the end of the merchant number and the transaction amount may be concatenated after the seed table value) to generate a code. As yet a further step, the code may be used to generate a final value. For example, the code may be hashed to create a final value for comparison with the TLID included in the FIM. Because the seed table is unique with specific values at specific entries of the table and is shared only between a single POS device and the transaction system 114, other devices are unable to identify the seed table value used. Even if a known code is used to identify the entry to use (e.g., the last digit of the minutes and the last digit of the seconds in the transaction request time field), an intercepting device without the unique seed table will be unable to generate the correct final value because the seed value from the seed table would not be known.

Customer database 120 can include known customer data, including source information associated with the customer. The customer, for the purposes of the transaction system 114, can be the merchant or seller that is utilizing the POS device to complete a transaction. That merchant or seller is the customer of the transaction system 114. The known customer data can include source information, such as information about the source of the transactions associated with this customer. For example, a known customer may communicate with transaction system 114 via the IP line and have a known IP address. As another example, a known customer may communicate with transaction system 114 via the dial line and have a known telephone number. The known information associated with each customer can be stored in customer database 120 for use by front end interfaces 118. Front end interfaces 118 can query the customer database 120 for customer information associated with a transaction request and compare the source information of transaction requests with the customer information returned by the query. If the source information does not match the known customer information, the transaction request can be declined, for example. If the known customer information does match the source information, the FIM can be passed to the transaction processing subsystem 122 for further processing of the transaction. Customer database 120 can be any suitable database, including a relational database, a multi-dimensional database, or any other suitable database.

Transaction processing subsystem 122 can be implemented as a software, hardware, and/or firmware component of transaction system 114. The transaction processing subsystem 122 can receive the FIM for a transaction request from the front end interfaces 118. The transaction processing subsystem 122 can process the transaction according to the obtained information from the front end interfaces 118, including whether the transaction request should be declined based on the ASI information. If the transaction request should not be declined, the transaction processing subsystem 122 can process the transaction to transfer the appropriate funds for the customer.

Output interface 124 can be implemented as a software, hardware, and/or firmware component of transaction system 114. Output interface 124 can be responsible for communicating over the appropriate network (e.g., PSTN 112 or network 110) with the associated POS device (102, 104, 106, or 108) the results of the transaction request. If the transaction request was declined, the output interface 124 can send the message indicating the transaction was declined to the originating POS device (102, 104, 106, or 108). Similarly, if the transaction request was approved, the output interface 124 can send the message indicating the transaction was approved to the originating POS device (102, 104, 106 or 108).

Security analysis database 126 can be any suitable database, including a relational database, a multi-dimensional database, or any other suitable database. Security analysis database 126 can store transaction request information, including the ASI data. Transaction processing 122 can be used to store the transaction request information and associated ASI data in the security analysis database 126. Optionally, the security analysis database can be queried to identify denial of service attacks and other fraudulent activities.

Figure 3:
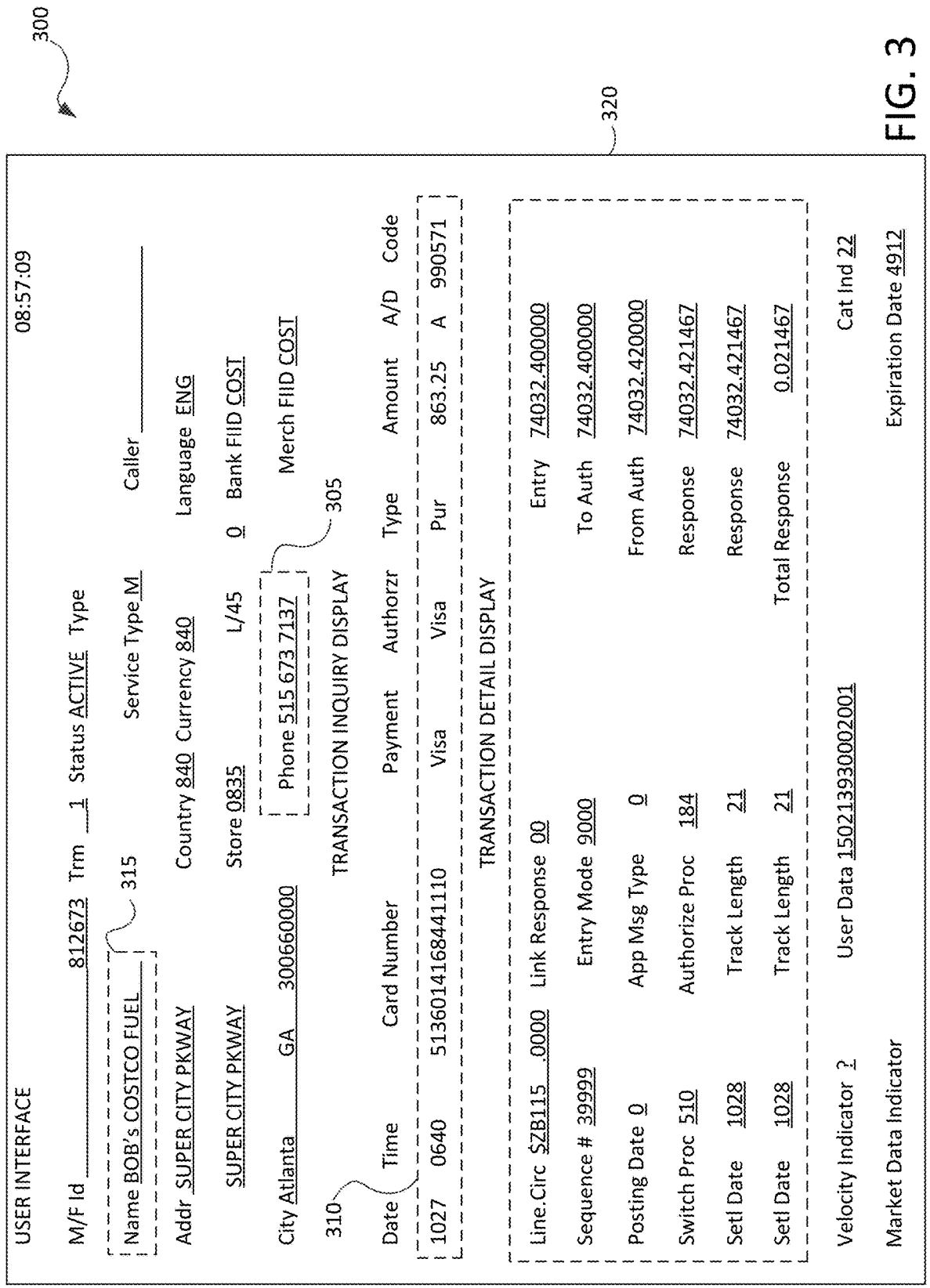
FIG. 3 illustrates an exemplary graphical user interface for searching a transaction detail according to an embodiment.

User interface 128 can be implemented as a software, hardware, and/or firmware component of transaction system 114. User interface can provide an interface to terminal 130 of data stored in security analysis database 126. A user may use user interface 128 to review security data, generate reports, run queries, and the like. Any suitable user interface for accessing security analysis database 126 may be used. A graphical user interface may be provided by user interface 128 to provide a user friendly graphical interface for a user to search and manipulate the information in security analysis database 126. An example graphical user interface 300 is depicted in FIG. 3 that a user may view. In some embodiments, user interface 128 may include a subsystem that automatically identifies issues such as denial of service attacks or other suspected fraudulent activity. User interface 128 may then send an alert to registered users notifying the users of the suspect activity.

Terminal 130 can be any suitable computer that can communicate with user interface 128. Terminal 130 can be, for example, computer system 400 of FIG. 4. Optionally, terminal 130 can be an input (e.g., mouse and/or keyboard) and an output (e.g., display monitor) directly connected to transaction system 114. As such, the information in security analysis database 126 may be queried and reviewed. In some embodiments, a user application may be installed on terminal 130 for interfacing with user interface 128. In some embodiments, the user interface 128 is provided and a user on terminal 130 may access it through, for example, a browser on terminal 130. The chosen configuration of an installed application, a browser accessing the user interface 128, or any other configuration may be used to allow a user to access data in security analysis database 126.

In use, for example, POS device 102 can send a transaction request via network 110 to transaction system 114. A line handler 116 can receive the transaction request. The line handler 116 can determine, based on the header of the transaction request, whether the header is an SIH. If the header includes the source sender data, an example of which is described in more detail with respect to FIG. 2, the line handler 116 can determine that the header is an SIH. If the line handler 116 determines that the header is an SIH, the line handler 116 can extract the ASI information. In this case, the line handler 116 can be an internet line handler 116 because the transaction request came in over network 110. The ASI information extracted can be, therefore, an IP address of the POS device 102. As discussed herein, other protocols can be used in network 110 such that POS 102 may have a unique address other than an IP address. Any unique source address may be identified in the header such that the header is an SIH based on the communication protocol used over network 110. The line handler 116 can generate a FIM for use in the transaction system 114 that includes the transaction request information as well as the ASI information. The line handler 116 can send the FIM to the front end interface 118.

The front end interface 118 can identify the customer based on information in the transaction request. For example, the transaction request can include a customer ID. The front end interface can then search the customer database 120 for the customer information associated with that customer, for example, using a customer ID query. The customer information can include, for example, an expected source IP address, an expected source line, and/or an expected message format. The front end interface 118 can compare the customer information with the ASI in the FIM to see if the information from the customer database 120 corresponds with the ASI. For example, the ASI information can include the IP address of the POS device 102. The customer information from customer database 120 for the identified customer may also include an IP address as an expected source IP address. If the customer information does not include an IP address or the IP addresses do not match, the front end interface can determine that the transaction request may be fraudulent and decline the transaction. As another example, the ASI information can include that the line used for communicating the transaction request was the IP line. The customer information can include that the expected line is either a dial line or an IP line. If the expected line is dial line for this customer and the transaction request came in on the IP line (through an IP line handler 116), the front end interface can determine this transaction request may be fraudulent and decline the transaction. If the expected line matches the line the transaction request was received on (e.g., it was received on the IP line through an IP line handler 116 and the expected line is the IP line), the transaction can proceed. As another example, the ASI information can include the message format information, and the customer information can include an expected format. If the transaction request format doesn't match the expected format, the front end interface can determine the transaction request may be fraudulent and decline the transaction. If the format matches the expected format, the transaction request can proceed.

As an optional additional security check, a transaction level identifier (TLID) may be included in the FIM and check by TLID check subsystem 132. For example, a unique seed table may be shared between the transaction system 114 and the POS device 102. When a transaction request is generated at POS 102, POS 102 may generate a TLID. The TLID may be, as an example, a code included in the transaction request. The code may be generated by using some value from the transaction request to identify an entry in the seed table. As an example, two selected digits from the transaction timestamp may be used to identify an entry in the seed table. The corresponding seed table entry value may be used to generate the code. For example, seed table value can be combined with other values within the transaction request and/or encrypted, hashed, and/or used in an algorithm to generate the code. The code can be included in the transaction request. The TLID check subsystem 132 may then use the known values from the transaction request to identify the seed table entry. The TLID check subsystem 132 may use the value in the seed table entry to generate the code. The code generated by the TLID check subsystem 132 may be compared to the TLID included in the FIM. If the codes match, the TLID check subsystem 132 may respond with an approval to the front end interface 118. If the codes do not match, the TLID check subsystem 132 may respond with a denial to the front end interface 118.

The front end interface 118 can send the FIM along with information on whether the transaction request should be declined or not based on the ASI information and/or the TLID check subsystem 132 response to the transaction processing subsystem 122. If the transaction request is declined, the transaction processing subsystem 122 can generate and send a decline message to the output interface 124, which can send the decline message to the POS device 102 via network 110. If the transaction request is not declined, transaction processing subsystem 122 can process the transaction and generate and send an approved message to the output interface 124, which can send the approved message to the POS device 102 via network 110. The transaction processing subsystem 122 can further store the ASI information and the transaction request information in security analysis database 126.

A user can additionally utilize terminal 130 to access user interface 128 for submitting queries to security analysis database 126. Terminal 130 may include a graphical user interface that the user can utilize to submit queries to the security analysis database 126 via user interface 128 to identify specific transactions for viewing as well as aggregated information to identify potential or past threats, including denial of service attacks.

Figure 2:
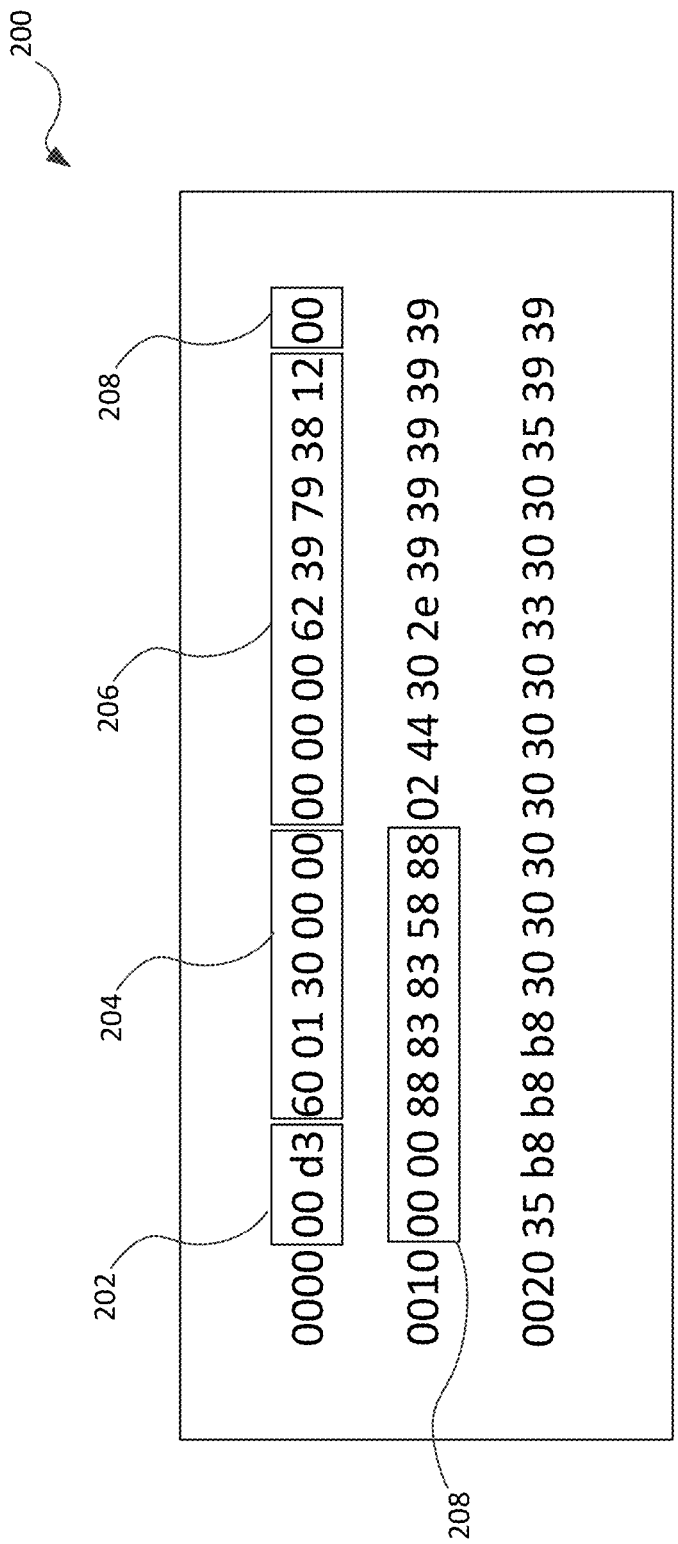
FIG. 2 illustrates a portion of an exemplary header from an inbound transaction request according to an embodiment.

FIG. 2 illustrates a portion of an exemplary SIH 200 from an inbound transaction request. The SIH 200 is an example and can be formatted in any suitable way and/or be any suitable length. Each transaction request may include a header. Transaction request headers that include information about the source or origination of the transaction request are SIHs. The SIH 200 can include source information such as, for example, the ASI information. As discussed herein, the ASI information may include the ANI, DNIS, and/or source IP address. The SIH 200 can be the header of a transaction request, such as a transaction request submitted from POS devices 102, 104, 106, and/or 108 and received by transaction system 114 of FIG. 1. SIH 200 can include source information from a dial line transmission request, meaning that the source information may include ANI and DNIS information, from an IP line transmission request, meaning that the source information may include an IP address, or from any other network, meaning that the source information may include some other unique address indicating the source or origin of the transmission request for that network protocol.

SIFT 200 can include a length indicator 202, transport protocol data unit ("TPDU") data 204, the ANI 206, and the DNIS 208. The length indicator 202 can be a variable length value that indicates the length of the header. The TPDU data 204 can be a five byte value. The TPDU data 204 can include a one byte TPDU identifier ("TPDU ID"), a two byte destination address, and a two byte source address. As shown in FIG. 2, for example, the TPDU ID can be "60," the destination address can be "01 30," and the source address can be "00 00."

The ANI 206 can be an eight byte value that transmits the automatic number identification, which identifies the origination telephone number of the transaction request. FIG. 2 depicts an example ANI, which can be "00 00 00 62 39 79 38 12." In this case, the origination telephone number is "623-979-3812." The DNIS 208 can also be an eight byte value that transmits the dialed number identification service, which is a code that identifies the number dialed by the originator of the transaction request. FIG. 2 depicts an example DNIS, which can be "00 00 00 88 83 83 58 88." In this case, the number dialed by the source sender is "888-383-5888." Optionally, the SIH 200 can include other information including, for example, biometric information associated with the message source, encrypted identification, cryptograms, and/or any other suitable information. The information within SIH 200 can be used as an identifier of the message source alone or in conjunction with other information known about the expected message source.

Once extracted, the line handler (e.g., line handler 116 of FIG. 1) can incorporate the ANI 206 and DNIS 208 in the FIM. In this case, two existing 64 bit (8 byte) fields that are initialized to zero are timestamps identified in the FIM as Reply Time and Switch Time. These fields are not used initially in the FIM, so the system can repurpose the fields to handle the ANI and DNIS on initial transmission of the FIM from the line handler to the front end interface (e.g., front end interface 118 of FIG. 1). Because the values for ANI and DNIS are only needed upon receipt at the front end interface, as described with respect to FIG. 1, the space in the FIM can be overwritten at the front end interface before transmitting the FIM to the transaction processing subsystem (e.g., transaction processing subsystem 122 of FIG. 1). If the ANI or DNIS are not included in the header of the transaction request (or some other unique source information, meaning it is not a SIH), then the line handler will ensure the fields are set to zero, indicating an absence of ANI and DNIS information.

Additionally, a field in the FIM can be designated Source IP, which can contain the source IP address from a transaction request sent over an IP network, for example network 110 of FIG. 1. An additional field can be used to identify the communication method identified by the line handler (e.g., line handlers 116 of FIG. 1). For example, the Logging Flag field can be used to set an indicator of a communication protocol requiring an ANI-DNIS transaction request versus an IP transaction request. While ANI-DNIS and IP address are two common unique address types that are currently known for the common PSTN and IP network, any communication protocol can be used and therefore any unique address or information that indicates the source or origin of the transaction request may be used. The logging Flag field can identify the protocol and the source address can be stored in the FIM for any protocol as described with respect to IP, for example. Again, these fields can be used for this purpose in the FIM sent from the line handler to the front end interface. The front end interface can then change the values for another purpose before transmitting the FIM to the transaction processing subsystem. For example, the front end interface can map the ANI-DNIS or IP address information into an additional field in the FIM for later capture in the database or for merchant validation prior to re-use of those fields for their original purpose (reply time, switch time, logging indicator).

FIG. 3 illustrates an exemplary graphical user interface 300 for searching a transaction detail. The graphical user interface 300 can be a user interface displayed on terminal 130 via user interface 128 of FIG. 1. The graphical user interface 300 can be used, for example, to search for specific transaction requests as well as general searching to identify threats or fraudulent activity, including denial of service attacks. In some embodiments, user interface 128 or a subsystem of transaction system 114 may automatically detect suspect transaction requests and transmit an alert for display by the graphical user interface 300 on terminal 130.

The graphical user interface 300 depicted in FIG. 3 includes a search of an example customer, Bob's Costco Fuel 315. The customer information includes, for example, the telephone number 305 of the customer. The search also returns a transaction inquiry with a transaction entry 310. The transaction entry 310 can include, among other information, the date and time of the transaction, the credit card number for the transaction, the amount of the transaction, and the authorization code of the transaction.

The graphical user interface 300 can also include a detail transaction display 320 of at least one transaction. The detail transaction display 320 can include authorization and response details, settlement date details, and other details of the transaction.

In use, the graphical user interface 300 can include multiple transactions for a given customer in a short period of time, especially if for a same credit card, which can, for example, indicate fraudulent activity. The user interface 300 can be used to search the security analysis database (e.g., security analysis database 126 of FIG. 1) for any information helpful for identifying security issues or fraudulent activities.

Figure 4:
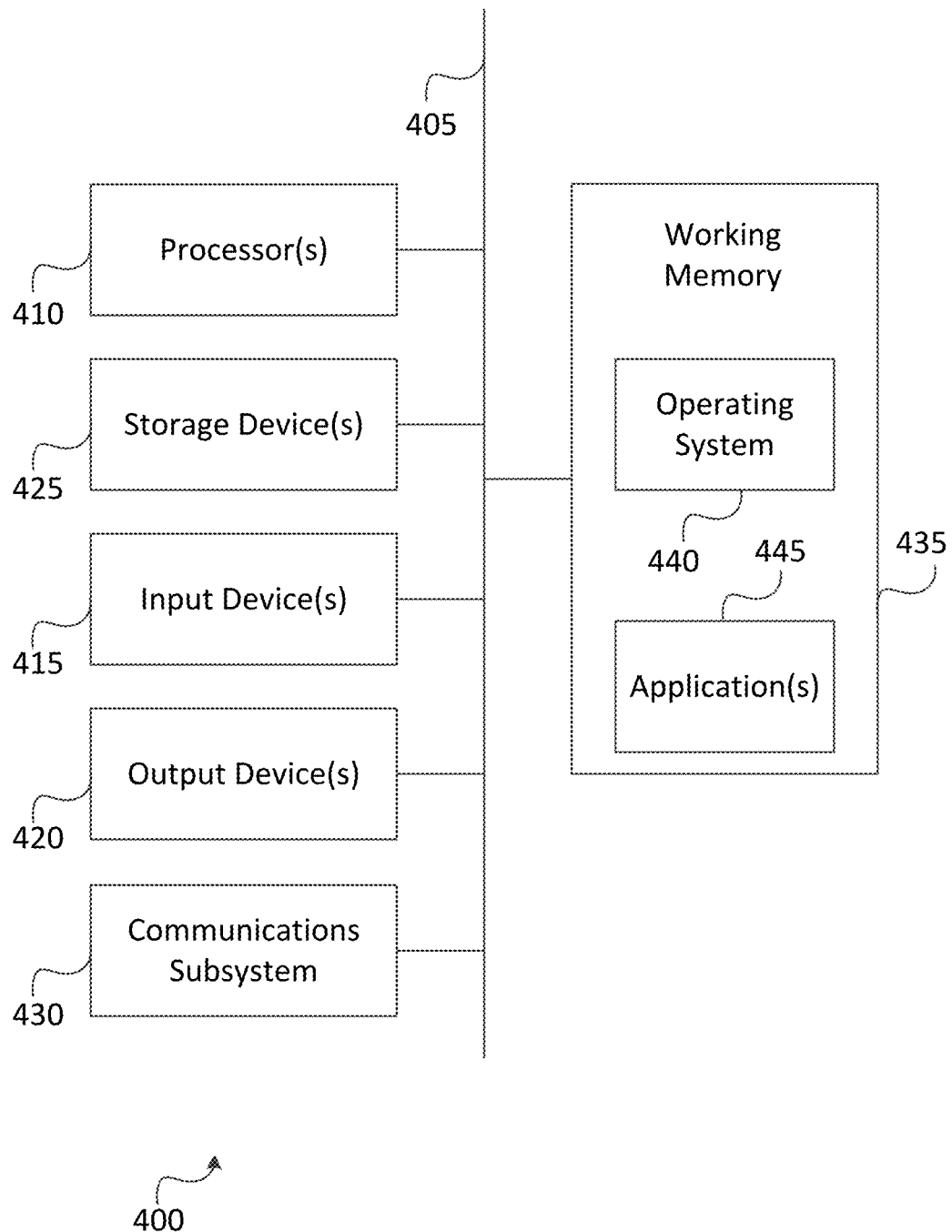
FIG. 4 illustrates an exemplary computer system.

FIG. 4 illustrates an embodiment of a computer system 400. A computer system 400 as illustrated in FIG. 4 may be incorporated into devices such as a personal computer, server computer, mobile device (e.g., smartphone, smart watch, tablet, and the like), point of service ("POS") terminal, and the like. FIG. 4 provides a schematic illustration of one embodiment of a computer system 400 that can perform some or all of the steps of the methods provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405, or may otherwise be in communication, as appropriate. The hardware elements may include one or more processors 410, including without limitation one or more general-purpose processors and/or one or more special-purpose processors such as digital signal processing chips, graphics acceleration processors, and/or the like; one or more input devices 415, which can include without limitation a mouse, a keyboard, a camera, a remote control, and/or the like; and one or more output devices 420, which can include without limitation a display device, a printer, and/or the like.

The computer system 400 may further include and/or be in communication with one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 430 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate transaction and/or other information via the communications subsystem 430. In other embodiments, a portable electronic device, may be incorporated into the computer system 400 (e.g., an electronic device), as an input device 415. In many embodiments, the computer system 400 will further comprise a working memory 435, which can include a RAM or ROM device, as described above.

The computer system 400 also can include software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. The software elements can be programs running within a single system or running within multiple systems running as services for a more distributed processing solution or a cloud based solution. Merely by way of example, one or more procedures described with respect to the methods discussed above, such as those described in relation to FIG. 6, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 425 described above. In some cases, the storage medium might be incorporated within a computer system, such as computer system 400. In other embodiments, the storage medium might be separate from a computer system (e.g., a removable medium), such as a compact disc, and/or provided in an installation package, such that the storage medium can be used to program, configure, and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 400 to perform methods in accordance with various embodiments of the technology. According to a set of embodiments, some or all of the procedures of such methods are performed by the computer system 400 in response to processor 410 executing one or more sequences of one or more instructions, which might be incorporated into the operating system 440 and/or other code, such as an application program 445, contained in the working memory 435. Such instructions may be read into the working memory 435 from another computer-readable medium, such as one or more of the storage device(s) 425. Merely by way of example, execution of the sequences of instructions contained in the working memory 435 might cause the processor(s) 410 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 400, various computer-readable media might be involved in providing instructions/code to processor(s) 410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 425. Volatile media include, without limitation, dynamic memory, such as the working memory 435.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400.

The communications subsystem 430 and/or components thereof generally will receive signals, and the bus 405 then might carry the signals and/or the data, instructions, etc. carried by the signals to the working memory 435, from which the processor(s) 410 retrieves and executes the instructions. The instructions received by the working memory 435 may optionally be stored on a non-transitory storage device 425 either before or after execution by the processor(s) 410.

Figure 5:
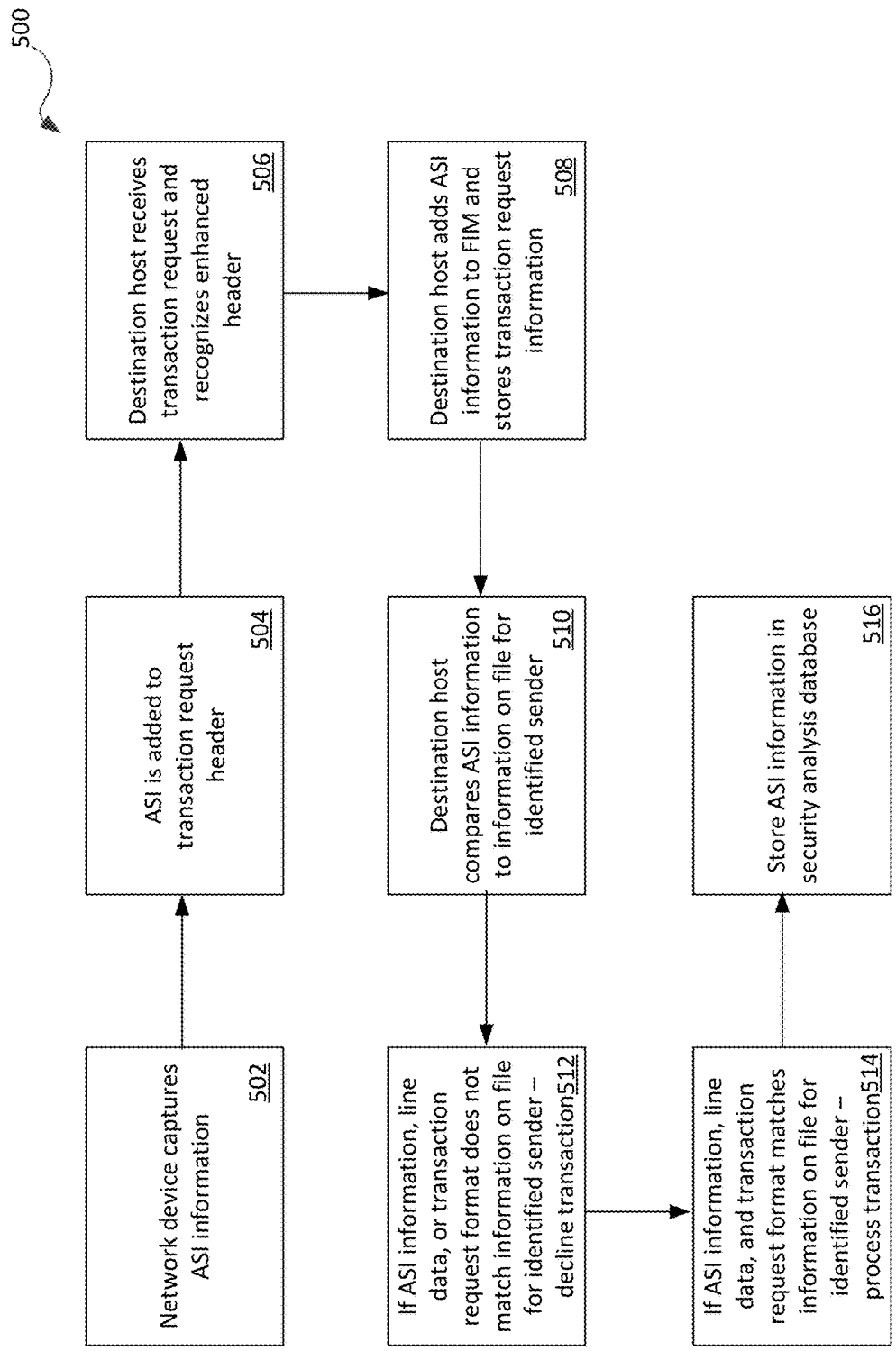
FIG. 5 illustrates an exemplary flow diagram of information through an ASI system.

FIG. 5 illustrates a flow diagram 500 of information through an ASI system. The flow diagram 500 can show the flow of a transaction request through the entire system, such as system 100 of FIG. 1. The transaction request can be sent from a POS device (i.e., a network device), such as, for example, POS device 102, 104, 106, and/or 108 of FIG. 1.

At 502, the network device can capture the ASI information. The ASI information can include some or all source information. For example, the origination telephone number (i.e., the sender's telephone number), the dialed telephone number, and/or the source IP address (i.e., the sender's IP address) can be ASI information. This information can be captured by, for example, POS device 102, 104, 106, and/or 108 of FIG. 1.

At 504, the ASI is added to the transaction request header by the network device. For example, the ASI can be added to the transaction request header by POS device 102, 104, 106, and/or 108 in FIG. 1 as described with respect to SIH 200 of FIG. 2. The transaction request can then be transmitted to the transaction processing system (e.g., transaction system 114 of FIG. 1).

At 506, the destination host (e.g., transaction system 114) can receive the transaction request. Upon receipt, the destination host can inspect the header and determine that the header is an enhanced header (i.e., SIH). The enhanced header or SIH can include the source information allowing the destination host to utilize the enhanced security described herein to identify fraudulent activities. The destination host can identify the enhanced header by, for example, identifying the ANI and/or DNIS fields identified in FIG. 2.

At 508, the destination host can add the ASI information to the FIM and store the transaction request information. As described with respect to FIG. 1, for example, the line handler can add the ASI information to the FIM, and the transaction processing subsystem can store the transaction request information in the security analysis database.

At 510, the destination host can compare the ASI information to information on file for the identified sender. As described with respect to FIG. 1, for example, the front end interface can query the customer database for customer information on the identified customer. Once the known customer information is obtained, it can be compared to the information received in the transaction request. The comparison can include, for example, a comparison of the expected line versus the line the transaction request was received on. As another example, the comparison can include a comparison of a message format of the transaction request versus an expected message format. As another example, the comparison can include a comparison of the source telephone number or IP address with the customer's known source telephone number or IP address. Any combination of the comparisons can be implemented in any order.

At 512, if the comparison failed, the transaction request can be declined. For example, a decline notice or message may be transmitted to the POS device. At 514, if the comparison succeeded, the transaction request can be approved and processed.

At 516, the ASI information can be stored in the security analysis database. The security analysis database can then be utilized to identify fraudulent activities and threats, including denial of service attacks. The security analysis database can be queried manually through, for example, a user interface such as user interface 128 and terminal 130 of FIG. 1. Optionally, automatic queries can be performed that identify fraudulent activities or threats like denial of service attacks. For example, pattern matching can be used to identify fraudulent activities or repetitive attempts. As another example, if a potential threat is identified, a query can be run on the database to track the problem to its source. Previously, tracing would be implemented through individual network devices to the entry point of the malicious activity. Using this system can allow for faster detection of fraudulent and/or malicious activity. As another example, nightly automatically executed jobs can run to query the database and load information into a trending application to track trends and provide reporting information. If a threat is identified, a notification can be sent, for example, to an administrator for further investigation. Optionally, if a potential threat is identified, the transaction processing system can temporarily suspend processing to protect against the threat. Optionally, an alert may be sent to users (e.g., registered users) notifying the user of the potential threat.

Figure 6:
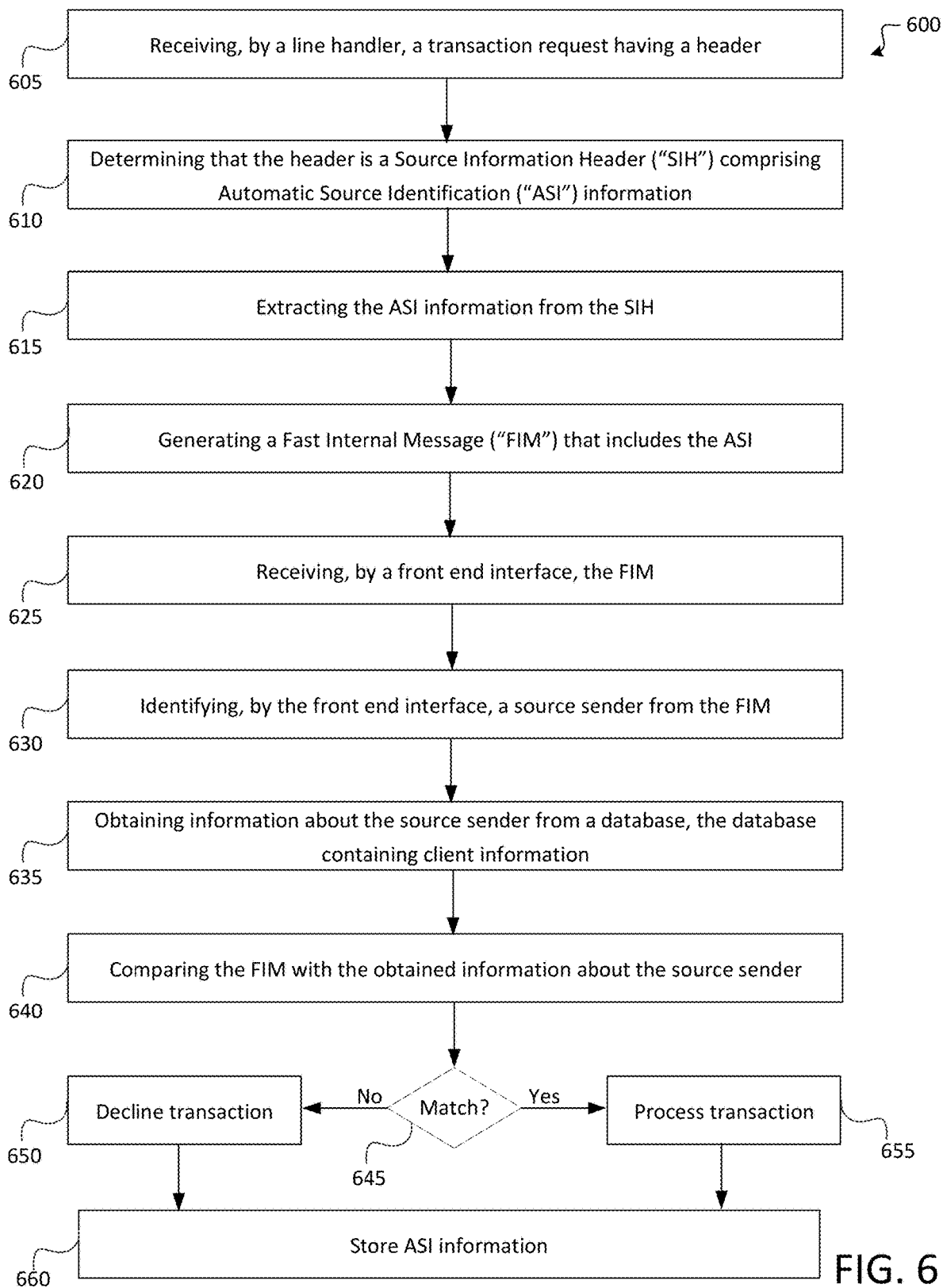
FIG. 6 illustrates an exemplary method for enhancing security using ASI.

FIG. 6 illustrates an exemplary method 600 of enhancing security using ASI. The method 600 can be performed by, for example, transaction system 114 of FIG. 1.

Method 600 can begin at 605 with a line handler receiving a transaction request having a header. For example, line handler 116 of FIG. 1 can receive a transaction request. The transaction request can include a header, such as SIH 200 of FIG. 2.

At 610, the line handler can determine that the header is a SIH that includes ASI information. SIH 200 of FIG. 2, for example, included ANI and DNIS information, which is ASI information as described above. The line handler may access the header and search for an entry in a specific field to identify the header as an SIH. For example, the header may include the ANI-DNIS, which the line handler may recognize. As another example, the line handler may check the field that contains the IP address and identify that an IP address is included, making the header an SIH. In some embodiments, the SIH may be identified by hexadecimal characters leading the SIH. The hexadecimal characters may represent a value so large that they could not represent the length of a normal message. Because the begging few characters of a message typically represent the length of the message, such a large value may indicate that the header is an SIH. In some embodiments, the hexadecimal characters may be appended to the beginning of the message by externally facing network devices that capture the source IP and/or source ANI-DNIS information and build the SIH with the hexadecimal characters prepended to the header.

At 615, the line handler can extract the ASI information from the SIH. For example, as described with respect to FIG. 2, the line handler can identify the ANI and DNIS information and extract the information from the SIH.

At 620, the line handler can generate a FIM that includes the ASI. The FIM can be a message formatted for the transaction processing subsystem to process the transaction. The line handler can transmit the FIM to the front end interface (e.g., front end interface 118 of FIG. 1).

At 625, the front end interface can receive the FIM. At 630, the front end interface can identify a source sender from the FIM. The source sender can be identified with, for example, a customer identifier within the FIM. At 635, the front end interface can obtain information about the source sender from a client information database. For example, the client identifier can be used to search the client information database to return information about that client. The client information can include, for example, an expected line, an expected source number (e.g., source telephone number or source IP address), and/or an expected message format.

At 640, the front end interface can compare the data in the FIM with the customer information obtained from the database. For example, the front end interface can compare the expected line with the information in the FIM identifying the line the transaction request was received on. As another example, the front end interface can compare the message format of the transaction request with the expected message format for that customer. As yet another example, the front end interface can compare the ASI (e.g., the source telephone number or the source IP address) with the source information for that customer. In some embodiments, the front end interface can make more than one comparison if the information is available in the FIM. For example, the FIM may identify the line and the message format and the customer database may also include both of those expected values. In such a case, two comparisons can be done. If one or more comparison fails, the transaction may be denied, for example. In some embodiments, if at least one comparison succeeds, the transaction may be approved, for example. The approval/denial rules may be configurable. For example, absolute success (no comparisons fail) may be required in some embodiments.

At 645, the front end interface can determine whether the information in the FIM matches the customer information obtained from the database. If the front end interface determines that the information matched (or at least partially matched in some embodiments), at 655 the transaction can be processed. If the front end interface determines that the information did not match (or at least partially did not match in some embodiments), at 650, the transaction can be declined.

At 660, the system can store the ASI information. As discussed with respect to FIG. 1, for example, the transaction processing subsystem can store the information in a security analysis database. The security analysis database can be queried to identify fraudulent transactions as well as threats such as denial of service attacks.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A transaction processing system comprising:
   one or more processors; and
   a memory having stored thereon instructions that, when executed by the one or more processors, cause the one or more processors to:
      receive, from a point of sale device, a transaction request having a header and a first transaction level identifier;
      determine that the header is a Source Information Header ("SIH") comprising Automatic Source Identification ("ASI") information;
      extract the ASI information from the SIH;
      generate a Fast Internal Message ("FIM") comprising the ASI, wherein data within the FIM is standardized from multiple input and output formats into a single internal format;
      identify a source sender and first source sender information from the FIM;
      obtain second source sender information about the source sender from a database, the database containing client information;
      generate a second transaction level identifier, the instruction to generate the second transaction level identifier comprising instructions that, when executed by the one or more processors, cause the one or more processors to:
         identify a seed value based on the transaction request and a shared secret between the transaction processing system and the point of sale device,
         generate a code based on the seed value, and
         hash the code to generate the second transaction level identifier;
      determine an approval status of the transaction request by:
         declining the transaction request based on a determination that the first source sender information does not match the second source sender information, declining the transaction request based on a determination that the first transaction level identifier does not match the second transaction level identifier, or approving the transaction request based at least in part on a determination that the first source sender information matches the second source sender information and a determination that the first transaction level identifier matches the second transaction level identifier; and store data from the FIM including the ASI in the database.

2. The transaction processing system of claim 1, wherein the instructions comprise further instructions that, when executed by the one or more processors, cause the one or more processors to:

identify an expected source value from the second source sender information;

identify, from the ASI in the FIM, a source value of the transaction request; and determine whether the first source sender information matches the second source sender information based on whether the expected source value matches the source value of the transaction request.

3. The transaction processing system of claim 1, wherein the instructions comprise further instructions that, when executed by the one or more processors, cause the one or more processors to:

identify an expected transmission line for receiving the transaction request from the second source sender information;

identify, from the FIM, a transmission line on which the transaction request was received; and determine whether the first source sender information matches the second source sender information based on whether the expected transmission line matches the transmission line on which the transaction request was received.

4. The transaction processing system of claim 1, wherein the instructions comprise further instructions that, when executed by the one or more processors, cause the one or more processors to:

identify an expected message format for the transaction request from the second source sender information;

identify, from the FIM, a message format for the transaction request; and determine whether the first source sender information matches the second source sender information based on whether the expected message format matches the message format for the transaction request.

5. The transaction processing system of claim 1, wherein the ASI comprises an internet protocol ("IP") address from which the transaction request originated.

6. The transaction processing system of claim 1, wherein the ASI comprises a telephone number from which the transaction request originated.

7. The transaction processing system of claim 1, wherein the instructions comprise further instructions that, when executed by the one or more processors, cause the one or more processors to:

store the ASI information in a security analysis database; and identify fraudulent activity based on queries of the security analysis database.

8. The transaction processing system of claim 1, wherein the point of sale device is a first point of sale device of a plurality of point of sale devices, and wherein the shared secret comprises a unique seed table shared only between the first point of sale device and the transaction processing system.

9. The transaction processing system of claim 8, wherein:

identifying a seed value comprises selecting a seed entry from the unique seed table based on a timestamp associated with the transaction request.

10. A non-transitory, computer-readable medium having stored thereon instructions that, when executed by one or more processors, cause the one or more processors to:

receive, from a point of sale device, a transaction request having a header and a first transaction level identifier;

determine that the header is a Source Information Header ("SIH") comprising Automatic Source Identification ("ASI") information;

extract the ASI information from the SIH;

generate a Fast Internal Message ("FIM") comprising the ASI, wherein data within the FIM is standardized from multiple input and output formats into a single internal format;

identify a source sender and first source sender information from the FIM;

obtain second source sender information about the source sender from a database, the database containing client information;

generate a second transaction level identifier, wherein the instructions to generate the second transaction level identifier comprise instructions that, when executed by one or more processors, cause the one or more processors to:

identify a seed value based on the transaction request and a shared secret with the point of sale device, generate a code based on the seed value, and hash the code to generate the second transaction level identifier;

determine an approval status of the transaction request by:

declining the transaction request based on a determination that the first source sender information does not match the second source sender information, declining the transaction request based on a determination that the first transaction level identifier and the second transaction level identifier do not match, or approving the transaction request based at least in part on a determination that the first source sender information matches the second source sender information and a determination that the first transaction level identifier matches the second transaction level identifier; and store data from the FIM including the ASI in the database.

11. The non-transitory, computer-readable medium of claim 10, wherein the instructions comprise further instructions that, when executed by the one or more processors, cause the one or more processors to:

identify an expected source value from the second source sender information;

identify, from the ASI in the FIM, a source value of the transaction request; and determine whether the first source sender information matches the second source sender information based on whether the expected source value matches the source value of the transaction request.

12. The non-transitory, computer-readable medium of claim 10, wherein the instructions comprise further instructions that, when executed by the one or more processors, cause the one or more processors to:

identify an expected transmission line for receiving the transaction request from the second source sender information;

identify, from the FIM, a transmission line on which the transaction request was received; and determine whether the first source sender information matches the second source sender information based on whether the expected transmission line matches the transmission line on which the transaction request was received.

13. The non-transitory, computer-readable medium of claim 10, wherein the instructions comprise further instructions that, when executed by the one or more processors, cause the one or more processors to:

identify an expected message format for the transaction request from the second source sender information;

identify, from the FIM, a message format for the transaction request; and determine whether the first source sender information matches the second source sender information based on whether the expected message format matches the message format for the transaction request.

14. The non-transitory, computer-readable medium of claim 10, wherein the ASI comprises an internet protocol ("IP") address from which the transaction request originated.

15. The non-transitory, computer-readable medium of claim 10, wherein the ASI comprises a telephone number from which the transaction request originated.

16. The non-transitory, computer-readable medium of claim 10, wherein the instructions comprise further instructions that, when executed by the one or more processors, cause the one or more processors to:

store the ASI information in a security analysis database; and identify fraudulent activity based on queries of the security analysis database.

17. The non-transitory, computer-readable medium of claim 10, wherein the point of sale device is a first point of sale device of a plurality of point of sale devices, and wherein the shared secret comprises a unique seed table shared only with the first point of sale device.

18. A computer-implemented method comprising:

receiving, from a point of sale device, a transaction request having a header and a first transaction level identifier;

determining that the header is a Source Information Header ("SIH") comprising Automatic Source Identification ("ASI") information;

extracting the ASI information from the SIH;

generating a Fast Internal Message ("FIM") comprising the ASI, wherein data within the FIM is standardized from multiple input and output formats into a single internal format;

identifying a source sender and first source sender information from the FIM;

obtaining second source sender information about the source sender from a database, the database containing client information;

generating a second transaction level identifier, the generating comprising:

identifying a seed value based on the transaction request and a shared secret with the point of sale device, generating a code based on the seed value, and hashing the code to generate the second transaction level identifier;

determine an approval status of the transaction request by:

declining the transaction request based on a determination that the first source sender information does not match the second source sender information, declining the transaction request based on a determination that the first transaction level identifier does not match the second transaction level identifier, or approving the transaction request based at least in part on a determination that the first source sender information matches the second source sender information and a determination that the first transaction level identifier matches the second transaction level identifier; and storing data from the FIM including the ASI in the database.

19. The computer-implemented method of claim 18, further comprising:

identifying an expected source value from the second source sender information;

identifying, from the ASI in the FIM, a source value of the transaction request; and determining whether the firsts source sender information matches the second source sender information based on whether the expected source value matches the source value of the transaction request.

20. The computer-implemented method of claim 18, further comprising:

identifying an expected transmission line for receiving the transaction request from the second source sender information;

identifying, from the FIM, a transmission line on which the transaction request was received; and determining whether the first source sender information matches the second source sender information based on whether the expected transmission line matches the transmission line on which the transaction request was received.

21. The computer-implemented method of claim 18, further comprising:

identifying an expected message format for the transaction request from the second source sender information;

identifying, from the FIM, a message format for the transaction request; and determining whether the first source sender information in the FIM matches the second source sender information based on whether the expected message format matches the message format for the transaction request.

* * * * *